United States Patent [19]

Klein

[11] Patent Number: 4,499,720
[45] Date of Patent: Feb. 19, 1985

[54] CABLE CARRIER

[75] Inventor: Ernst Klein, Dusseldorf, Fed. Rep. of Germany

[73] Assignee: A&A Manufacturing Co., Inc., New Berlin, Wis.

[21] Appl. No.: 459,043

[22] Filed: Jan. 19, 1983

[51] Int. Cl.³ .............................................. F16G 13/00
[52] U.S. Cl. ...................... 59/78.1; 219/93; 29/434
[58] Field of Search .................. 59/78.1, 91; 248/58, 248/60; 403/157; 29/434, 11; 219/81.6, 93

[56] References Cited

U.S. PATENT DOCUMENTS

| | | | |
|---|---|---|---|
| 2,302,954 | 11/1942 | Priest et al. | 29/434 |
| 2,527,479 | 10/1950 | Hall | 403/157 |
| 2,696,998 | 12/1954 | Roby | 29/434 |
| 3,448,954 | 6/1969 | Kurlandsky | 59/78.1 |
| 3,566,603 | 3/1971 | Chadwick | 59/78.1 |
| 3,848,407 | 11/1974 | Moritz | 59/78.1 |
| 3,913,716 | 10/1975 | Sedlock | 219/93 |
| 3,921,388 | 11/1975 | Loos et al. | 59/78.1 |
| 4,063,060 | 12/1977 | Litch | 219/93 |

FOREIGN PATENT DOCUMENTS

| | | | |
|---|---|---|---|
| 21153 | 1/1981 | European Pat. Off. | 59/78.1 |
| 1444307 | 7/1976 | United Kingdom | 59/78.1 |

Primary Examiner—Daniel C. Crane
Assistant Examiner—David B. Jones
Attorney, Agent, or Firm—Quarles & Brady

[57] ABSTRACT

A conductor guiding support formed of two chains retained in parallel spaced apart relationship by spacers which support the conductors between the chains. The chains are formed of successive links pivotably coupled to each other with each link being formed of two matching plates. One end portion of each plate is provided with a central hole and arcuate slots spaced about a circle that is concentric to the central hole. The opposite end portion of the plate is offset and is provided with bosses that are in a pattern that corresponds to the pattern of the hole and slots on the other end. Two plates are placed face-to-face to form a link and the portions with the central hole and arcuate slots are in surface contact with each other while the offset portion that present the bosses are spaced from each other. The portion of the succeeding link with the contacting surfaces is placed in this space with the bosses of the offset portion engaging the openings in the surface contacting portions. The boss in the central hole establishes the pivot point of the links relative to each other and the offset bosses in the arcuate slots limit this pivotal movement. The abutting bosses of the two plates are then welded together to secure the assembly.

4 Claims, 23 Drawing Figures

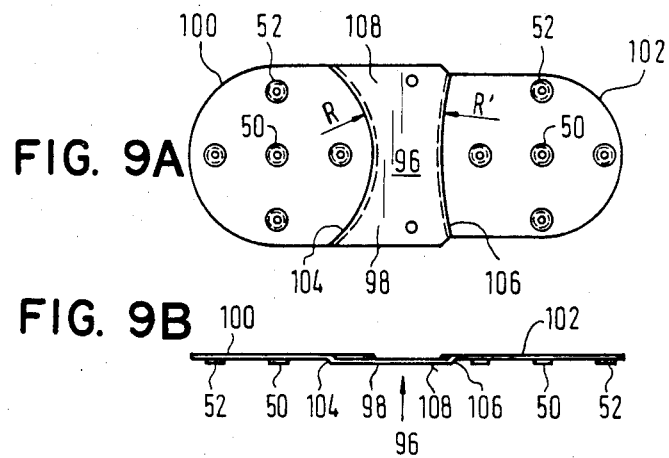
FIG. 9A
FIG. 9B
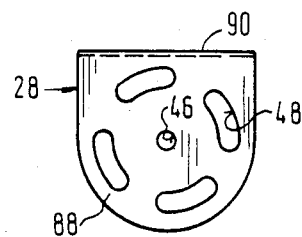
FIG. 10A  FIG. 10B
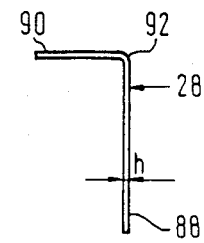
FIG. 11A  FIG. 11B

CABLE CARRIER

BACKGROUND OF THE INVENTION

The invention relates generally to carriers for supporting electric cables and hydraulic conduits and more particularly to carriers which guide such conductors in a specific path of travel as they move with machine elements to which they are coupled.

It has been the practice in the past to construct such cable carriers of chains formed of a plurality of links pivotally connected to each other by pins, rivets or bolts. This construction requires a large quantity of such connectors and results in a heavy and cumbersome assembly which is relatively expensive to manufacture.

Moreover, assembly of the links in this manner results in surface contact between adjacent links and the friction between these contacts must be overcome as the links are articulated, resulting in a substantial additional load on the power train of the machine.

It is therefore a general object of the present invention to provide an improved conductor guiding support which is sturdy in construction, efficient in operation and relatively inexpensive to produce.

The individual links of the present invention are adapted to be formed of sheet metal stampings for ease of manufacture.

According to the present invention the multitude of individual connectors has been eliminated by the unique expedient of connecting the links to each other by welding while facilitating their ability to pivot relative to each other.

A further purpose of this invention is to minimize a frictional resistance to movement between adjacent surfaces by spacing the cooperating links of the chains from each other.

BRIEF SUMMARY OF THE INVENTION

The improved cable carrier of the present invention comprises two parallel chains maintained in spaced apart relationship by suitable spacer members. The conductors are supported between the chains by the spacer members. One end of the conductor support is connected to a movable member of the machine while the other end is normally connected to a fixed base of the machine. As the movable member is actuated, the conductor support moves with it taking the conductor with it in a predetermined path of travel.

The chains are formed of a plurality of successive links with each link being pivotally connected to its adjacent link for a limited amount of pivotal movement relative to each other. Each link is formed of two mating plates disposed face-to-face and secured to each other. One end of each plate is offset from the other end and is provided with bosses. The opposite end is provided with a central bore plus a plurality of arcuate slots which are spaced to receive the bosses on the adjacent link. The two sets of bosses on the two facing plates abut so that they can be welded together to secure the two plates together to form a single link. The arcuate slots limit the arcuate movement of the bosses to thereby limit the pivotal movement of adjacent links relative to each other.

BRIEF DESCRIPTION OF THE DRAWINGS

The foregoing and other objects of this invention, which will become more fully apparent from the following detailed description, may be achieved by means of the exemplifying apparatus depicted in and set forth in this specification in connection with the accompanying drawings, in which:

FIG. 3 is a horizontal section taken along the plane represented by the line III—III in FIG. 1;

FIG. 4 is a detailed view illustrating one of the bosses formed on each of the plates forming the links of the chain;

FIG. 9A is a detail view in front elevation of an end link plate;

FIG. 9B is a plan view of the end link illustrated in FIG. 9A;

FIG. 10A is a view in front elevation of an angular butt strap for securing a chain to the machine;

FIG. 10B is a detail view in side elevation of the butt strap illustrated in FIG. 10A;

FIG. 11A is a detail view in front elevation of a butt strap for securing the chain to the machine;

FIG. 11B is a detail view in side elevation of the butt strap illustrated in FIG. 11A.

Figure 1:
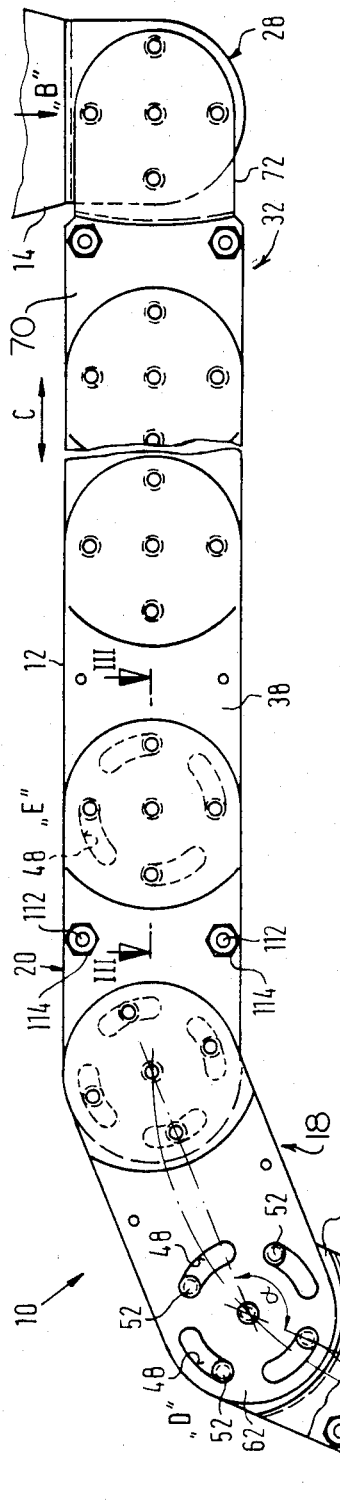
FIG. 1 is a view in front elevation illustrating a cable carrier in accordance with the present invention mounted on a machine.
Figure 2:
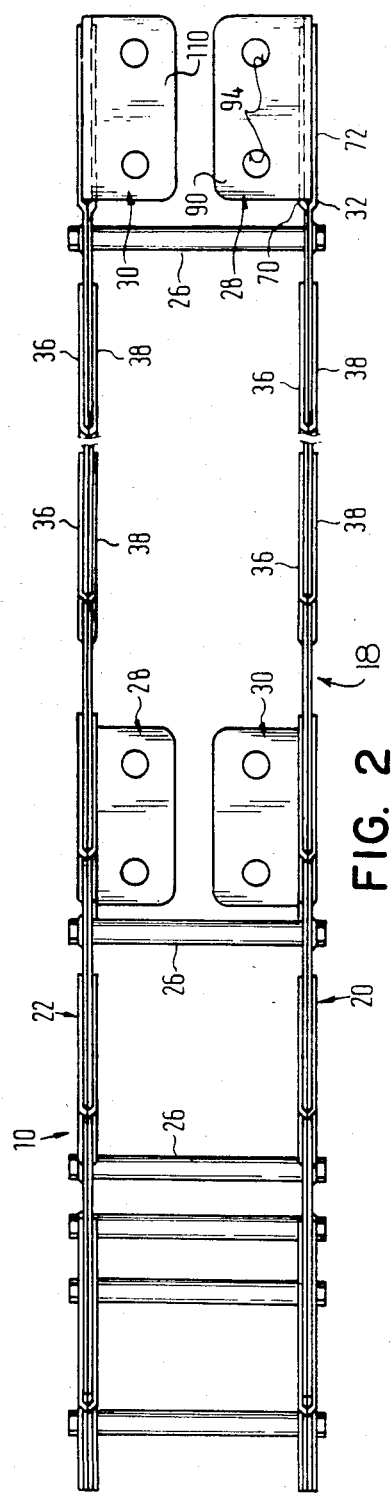
FIG. 2 is a plan view of a portion of the conductor support illustrated in FIG. 1.

Reference is now made more particularly to the drawings and specifically to FIGS. 1 and 2 thereof illustrating a conductor guiding support constructed in accordance with the teachings of the present invention. As there shown, one end of the support has a fixed connection "A" coupled to a stationary base 16 of the machine on which it is mounted. For example, the base 16 could be the bed of a machine tool. The other end of the support is fixed by a connection "B" to a movable member 14, such as a machine tool member which is movable relative to the bed 16. The member 14 will move in a horizontal direction as viewed in FIG. 1 along the path represented by the arrows "C". As clearly shown in FIG. 1, the support curves upwardly form its connection point A through an arc of 180° about a radius R" to its connection "B" with the movable member 14 of the machine. As the movable member moves to the left as viewed in FIG. 1, an increasing number of links 18 will lie flat upon the base 16 while the upper horizontal rectilinear portion will shorten in length.

As best seen in FIG. 2, the support comprises two parallel chains 20 and 22 retained in spaced relationship by spacer elements 26, which in this case are bolts. The two chains 20 and 22 are identical in construction and a description of one will apply to the other as well.

Figure 5A:
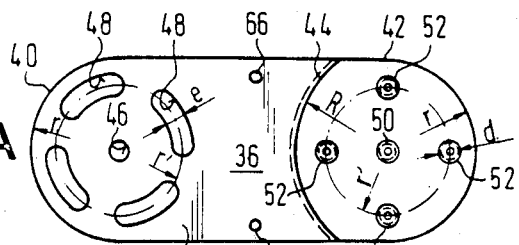
FIG. 5A is a detail view in front elevation of one of the plates forming the links of the chain.
Figure 5B:
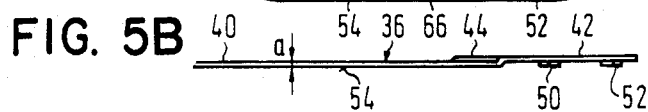
FIG. 5B is a plan view of the plate illustrated in FIG. 5A.

The chain 20 is formed of a number of consecutive chain links 18 with each chain link 18 being pivotable a limited amount relative to the succeeding link 18. Each of the chain links 18 is formed of two separate plates 36 and 38 secured together in matching overlying relationship. These plates are designed so that they can be simply stamped from a sheet of metal for inexpensive manufacture. The plate 38 is on the outside of the chain so that it is visible in FIG. 1 and is depicted in detail in FIGS. 6A and 6B. The inside plate 36 of each link 18 is illustrated in detail in FIGS. 5A and 5B. The plate 36, as clearly shown in FIG. 5A, is elongated and is formed with semicircular ends. The left end of the plate is identified by the reference numeral 40 and the right end of the plate is identified by the reference numeral 42. The right end 42 is offset from the left end 40 by an arcuate step 44 having the radius R which is greater than the radius r of the semicircular ends of the plate 36. The step 44 serves to offset the right end 42 from the left end 40 by a distance which is equal to the thickness "a" of the plate 36.

The end section 40 of the plate 36 is provided with a central hole 46 and four arcuate slots that are concentric with the hole 46. The slots 48 are formed in equally spaced relationship about a circle of radius r'. The width of each of the slots 48 is indicated by the letter e.

The right end 42 of the plate 36 is provided with a central boss 50 for cooperation with the hole 46 of the adjacent link 18 and four bosses 52 equally spaced about a circle of the radius r' for cooperation with the arcuate slots 48 of the adjacent link 18. The diameter d of each of the bosses 50 and 52 corresponds essentially to the diameter of the central hole 46 and the width e of the arcuate slots 48. The bosses 50 and 52 project from the end 42 of the plate 36 a distance equal to the height of the step 44 so that the extremities of the bosses 50 and 52 lie in approximately the same plane as the surface 54 of the plate 36.

An enlarged detail view of the boss 50 which is identical to the bosses 52 is illustrated in FIG. 4. As there shown, the boss 50 is of cylindrical configuration of the diameter d and present a circular surface 56. A protuberance 58 extends concentrically from the surface 56 to accommodate the welding procedure which will be subsequently described.

Figure 6A:
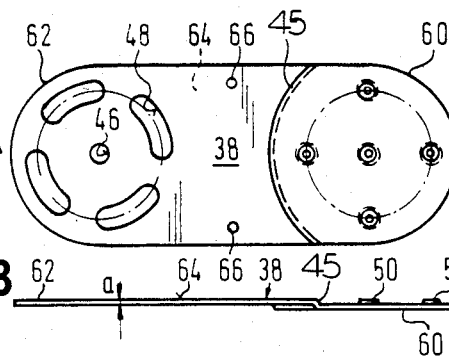
FIG. 6A is a detail view in front elevation of a plate which cooperates with the plate shown in FIG. 5A to form a link of the chain.
Figure 6B:
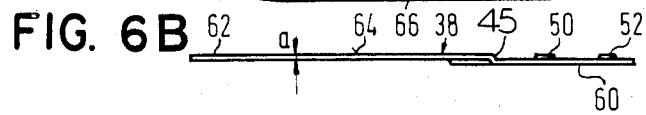
FIG. 6B is a plain view of the plate illustrated in FIG. 6A.

The plate 36 cooperates with the plate 38 illustrated in FIGS. 6A and 6B to form one of the links 18. The plate 38 is identical in construction to the plate 36 having the same central hole 46 and arcuate slots 48 formed in the left end 62 of the plate 38. In like manner, the right end 60 of the plate 38 includes the same bosses 50 and 52 as are provided on the plate 36. The only difference between the two plates 36 and 38 is that they are offset in opposite directions, the end 60 being offset from the end 62 by a step 45 which serves to offset the end 60 from the end 62 by a distance equal to the thickness "a" of the plate 38. Both plates 36 and 38 are provided with holes 66 for receiving the ends of the spacer members 26.

The union of the plate 36 with the plate 38 serves to form a chain link 18. To this end, the plates are placed in matching overlying relationship so that the two holes 46 and the arcuate slots 48 of the two plates are in alignment, and the bosses 50 and 52 of the two plates are in abutment. The surface 64 of the plate 38 is then in engagement with the surface 54 of the plate 36. However, since the ends 42 and 60 are offset they are spaced from each other and their spacing corresponds substantially to twice the wall thickness of one plate plus twice the height of one projection 58. The surface contacting ends 40 and 62 of the two plates 36 and 38 forming the succeeding link 18 are placed in this space with the holes 46 receiving the central bosses 50, and the arcuate slots 48 receiving the bosses 52.

The two plates are then joined by projection welding the five bosses 50 and 52 together. The projection welding fuses the protuberances 58 so that the end surfaces 56 of the bosses 50 and 52 are in contact with each other. Because of the protuberances 58, the clearance between the end sections 42 and 60 which are welded together, slightly exceeds the value 2a so that there is no interference with the pivotal movement of the two links 18 relative to each other. The area of fusion which is produced by the projection welding is clearly shown in FIG. 3 where the welds are identified by the reference numeral 68.

Figure 7A:
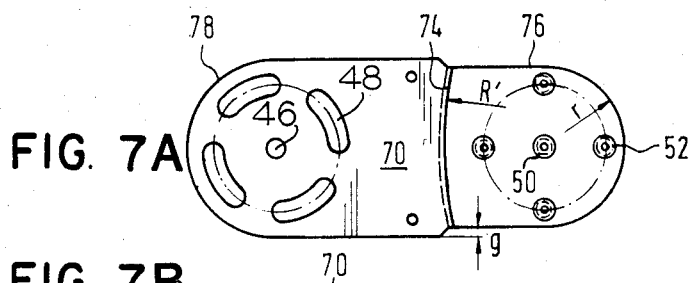
FIG. 7A is a detail view in front elevation illustrating one of the plates that forms an end link of the chain.
Figure 7B:
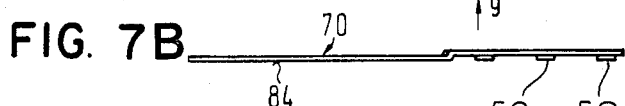
FIG. 7B is a plan view of the plate illustrated in FIG. 7A.
Figure 8A:
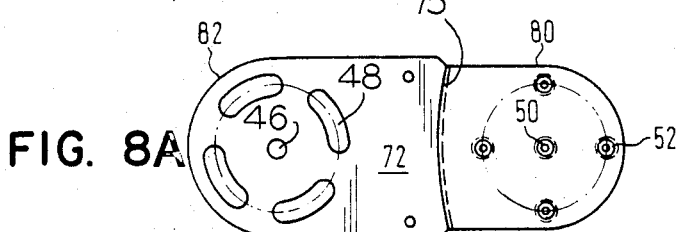
FIG. 8A is a detail view in front elevation of a plate that cooperates with the plate shown in FIG. 7A to form an end link of the chain.
Figure 8B:
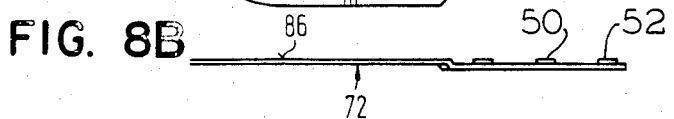
FIG. 8B is a plan view of the plate illustrated in FIG. 8A.

The end link 32 is very similar in construction to the regular links 18 but is modified slightly to accommodate its coupling to the butt strap 28 for attachment to the movable member 14 of the machine. Thus, the end link 32 is formed of two link plates 70 and 72 as illustrated in FIGS. 7 and 8, respectively. The plate 70 includes a left end 78 containing the central hole 46 and the arcuate slots 48 while its right end 76 is offset from the left end 78 by a step 74 and includes the bosses 50 and 52. The plate 70 is therefore very similar in construction to the plate 36. The differences lie in the fact that the step 74 has a larger radius R' than the radius R of the step 44 in the plate 36. In addition, the width of the end 76 is less than the end 78, being reduced by the distance 2g as shown in FIG. 7.

The plate 72 which mates with the plate 70 to form the end link 32 is identical in construction to the plate 70 except that a step 75 for offsetting its end 80 from its left end 82 is in the opposite direction from the step 74 to enable the two plates to match when mated.

The end link 32 which is coupled to the butt strap 28 is shaped in the form of an angle with an arm 90 for attachment to the movable element 14 and a depending arm 88 for connection to the end link 32. To this end, the end link 88 includes the central hole 46 and the four arcuate slots 48 in exactly the same manner as the normal end links 18. The arm 88 is placed between the two offset end sections 76 and 80 of the plates 70 and 72, respectively, with the bosses 52 contained in the arcuate slots 48 to permit arcuate movement of the end link 32 with respect to the bracket 28. In like manner, the bosses 50 are received within the central hole 46 to establish the pivot point of the end link 32.

The bosses 50 and 52 of the adjacent end link 18 are received in the central hole 46 and arcuate slots 48 of the end sections 78 and 82 of the plates 70 and 72, respectively. This completes the assembly and with the parts in that arrangement, the bosses 50 and 52 of the two plates 70 and 72, being now in abutment, are projection welded to secure the assembly together.

The end link 34 on the other end of the chain is also different from the normal links 18 as well as the end link 32. It is formed of two identical plates 96 shown in FIGS. 9A and 9B. The plate 96 comprises a central section 108 along with a left section 100 and a right section 102. The left section 100 is offset from the central section 108 by a step 104 and the right section 102 is offset an identical amount in the same direction by a step 106. The openings 46 and 48 which are provided on all of the other links of the chain are eliminated from the link 34. Instead, both the left section 100 and the right section 102 are provided with the bosses 50 and 52 arranged in exactly the same manner as they are arranged on the other links.

Two of the plates 96 are placed in matching relationship with all of the ten bosses 50 and 52 of one plate in abutting engagement with the corresponding bosses 50 and 52 of the second plate. The bosses 50 and 52 on the left end section 100 are received in the openings 46 and 48 of the adjacent end link 18. On the other hand, the bosses 50 and 52 of the right end section 102 are received in the central hole 46 and arcuate slots 48 of the bracket 30. Since only one bracket 30 is employed for coupling the link 34, the thickness h of the arm containing the openings 46 and 48 is twice the thickness of the plate 96. As a result, the space between the two right end sections 102 of the two plates 96 will be occupied by the arm of the butt strap 30. The butt strap 30 is identical in construction to the butt strap 28 which is attached to the movable member 14 of the machine except for the fact that the arm 110 extends in the opposite direction from the extension of the arm 90 of the butt strap 28.

As previously mentioned, the cable guiding support of the present invention includes two chains 20 and 22 which are maintained in parallel spaced relationship by a plurality of bolts 26. Both ends 112 of each bolt 26 are of reduced diameter and are provided with a thread for receiving a nut 114. The reduced diameter ends of the bolts 26 extend through the holes 66 and in the illustrated exemplary embodiment, a bolt is provided at the top and bottom of every second end link 18. This, of course, can vary to suit the prevailing conditions. The conductors which are to be carried by the support 10 are placed between the two chains 20 and 22 and between the upper bolts 26 and the lower bolts 26. Thus, the bolts 26 serve the dual purpose of joining the chains 20 and 22 as well as retaining the conductors within the confines between the two chains 20 and 22.

The arcuate slots 48 are arranged so as to cooperate with the bosses 52 of the adjacent link 18 to limit the amount of pivotal movement between two adjacent links. This is clearly illustrated in FIG. 1 where two links 18 ar shown pivoted the maximum amount relative to each other forming the angle alpha. This is the minimum angle that can be formed between the two links. Moreover, the arcuate slots 48 are so designed that as the several successive links 18 are pivoted relative to each other they will form the loop illustrated in FIG. 1 and enable the entire chain to traverse an angle of 180°. As a result, the horizontal links resting upon the base 16 are parallel to the horizontal links disposed at the opposite end of the loop.

The arrangement of the arcuate slots 48 and the bosses 52 is such that the links can only pivot in one direction from a straight line as shown in FIG. 1. As a result, when the link 18 reaches the horizontal position depicted at the top of FIG. 1, they support themselves in the straight line because they cannot pivot in the other direction. If the links were pivotable in the opposite direction, the entire support would collapse.

As the movable member 14 moves to the left as viewed in FIG. 1, the loop of links 18 will also move to the left and an additional number of links 18 will rest upon the base 16 while a lesser amount of links 18 will lie in the horizontal path extending from the top of the loop. As a matter of fact, even the end link 32 can pivot relative to the butt strap 28 so that there are no horizontal links 18 at the top of the loop and a maximum number of horizontal links resting upon the base 16. On the other hand, the movable member 14 can move to the right a sufficient amount so that all horizontal links 18 will extend from the top of the loop while there will be no horizontal links resting on the base 16 since the link 34 can also pivot relative to the butt strap 30.

The several views in FIG. 12 illustrate the versatility of the butt straps 28 and 30 to accommodate the structure of the machine on which they are mounted. They can be oriented in a number of different positions to suit the situation. The broken line identified by the reference numeral 120 indicates the horizontal longitudinal axis of the conductor support 10.

Figure 12E:
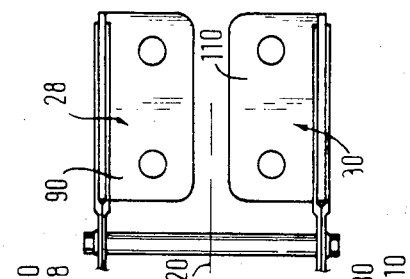
FIGS. 12A–12E are plan views depicting one end of the conductor support to illustrate different angular butt strap arrangements for various means of attachment of the chain to the machine.
Figure 12D:
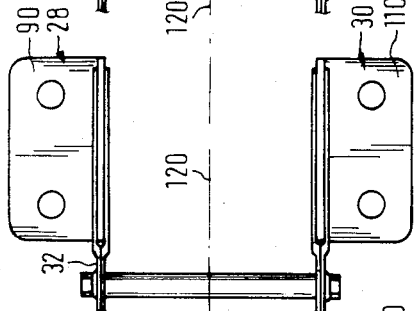
Figure 12C:
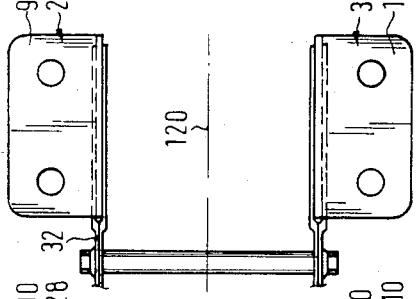
Figure 12B:
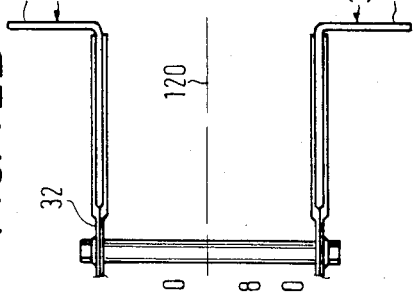
Figure 12A:
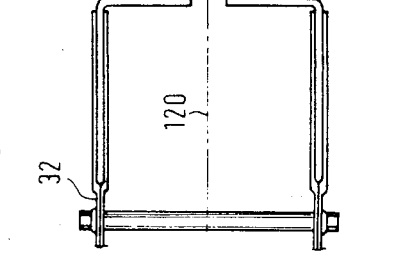

In FIG. 12A the butt straps 28 and 30 are illustrated in position with their arms 90 and 110, respectively, facing inwardly toward the longitudinal axis 120. On the other hand, FIG. 12B illustrates the same butt straps 28 and 30 with their arms 90 and 110 extending outwardly away from the longitudinal axis 120. In both FIGS. 12A and 12B the plane of the arms 90 and 110 is perpendicular to the longitudinal axis 120.

In FIGS. 12C, 12D and 12E the arms 90 and 110 are depicted with their plane parallel to the longitudinal axis 120. In FIGS. 12C and 12D the arms 90 and 110 are extending outwardly of the chain away from the longitudinal axis 120. However, in FIG. 12C the arms 90 and 110 are extending outwardly from the top of the chain, while in FIG. 12D they are extending outwardly from the bottom of the chain. FIG. 12E shows the arms 90 and 110 extending from the bottom of the chain but toward the longitudinal axis 120 rather than outwardly as shown in FIG. 12D. As illustrated in FIG. 2, each of the arms 90 and 110 of the butt straps 28 and 30, respectively, are provided with a pair of holes 94 for receiving suitable bolts (not shown) for mounting the butt straps to the machine.

From the foregoing detailed description of the illustrative embodiments set forth herein to exemplify the present invention, it will be apparent that there has been provided an improved conductor guiding support formed of two chains in which the links are formed of stampings that are assembled to each other consecutively by welding for forming the complete chain at a minimum expense while improving its efficiency. Moreover, the links are designed in such manner that pressure on contacting surfaces is alleviated so that there is a minimum amount of friction resisting the pivotal movement of the links relative to each other whereby the amount of power required to move the support is reduced to an absolute minimum.

Although the illustrative embodiment of the invention has been described in considerable detail for the purpose of disclosing a practical operative structure whereby the invention may be practiced advantageously, it is to be understood that the apparatus described is intended to be illustrative only and that the novel characteristics of the invention may be incorporated in other structural forms without departing from the spirit and scope of the invention, as defined in the subjoined claims.

I claim:

1. In a conductor guiding support formed of two chains retained in parallel spaced-apart relationship for receiving the conductors between them, each of said chains being formed of a plurality of links coupled to each other successively for limited pivotal movement relative to each other; each of said links being formed of two plates joined together in face-to-face, matching relationship; one end portion of said plates being offset from the other portion so that when said plates are joined together to form a link the offset portions are in surface contact with each other; a central boss extending from the offset portions of both matching plates so that the central boss of one plate abuts the central boss of the matching plate when the link is assembled; an off-center boss extending from the surfaces of said offset portions of both matching plates so that the offset boss of one plate abut the offset boss of the matching plate when the link is assembled; a central bore in each of said plates at the portion opposite said offset portion so that the contacting portions of said plates of a succeeding link can be inserted into the space between said offset portions of the preceding link with the central bore of said contacting portions in engagement with the central bosses of said offset portions to produce a pivotal connection; an arcuate slot in each of said plates at the contacting portion opposite said offset portion for receiving the offset bosses of the succeeding link when the links are coupled together to limit the pivotal movement of the links relative to each other; and means welding the abutting surfaces of each of said bosses together for securing the two plates together with the succeeding link coupled thereto by the engagement of said bosses with the central bore and arcuate slot of the succeeding link.

2. A conductor guiding support according to claim 1 including a protuberance extending from the abutting ends of each of said bosses so that the protuberances are fused during the welding process to space the offset portions a greater distance than the thickness of the two contacting portions of the succeeding link to thereby facilitate the pivotal movement between said offset portion and the contacting portion of the succeeding link disposed between said offset portions.

3. A conductor guiding support according to claim 1 wherein there are a plurality of said off-center bosses extending from the offset portion of said plate spaced from each other; and including a corresponding number of arcuate slots in the portion of at least one of the plates of each link opposite the offset portion for individual engagement with said off-center bosses of the succeeding link.

4. A conductor guiding support according to claim 1 including spacers secured between said chains for retaining said chains in spaced-apart relationship while serving to retain the conductors between said chains.

* * * * *